(12) United States Patent  
Renaudot

(10) Patent No.: US 7,036,805 B2  
(45) Date of Patent: May 2, 2006

(54) PNEUMATIC FRONT SUSPENSION ASSEMBLY FOR INDUSTRIAL VEHICLE

(75) Inventor: Jérôme Renaudot, Lyons (FR)

(73) Assignee: Renault V.I., Saint Priest (FR)

( * ) Notice: Subject to any disclaimer, the term of this patent is extended or adjusted under 35 U.S.C. 154(b) by 0 days.

(21) Appl. No.: 10/757,634

(22) Filed: Jan. 14, 2004

(65) Prior Publication Data

US 2004/0145097 A1 Jul. 29, 2004

Related U.S. Application Data

(63) Continuation of application No. PCT/FR02/02307, filed on Jul. 2, 2002.

(51) Int. Cl.
*B60G 21/04* (2006.01)

(52) U.S. Cl. .................... 267/189; 267/64.21; 267/187; 280/124.107; 280/124.157

(58) Field of Classification Search ......... 280/124.107, 280/124.116, 124.132, 124.157, 124.128; 267/122, 64.16, 64.19, 64.21, 64.23, 64.24, 267/64.25, 64.27, 66, 186, 187, 189, 191, 267/218, 219, 222, 223, 226, 234, 241, 256, 267/31, 263

See application file for complete search history.

(56) References Cited

U.S. PATENT DOCUMENTS

| | | | |
|---|---|---|---|
| 4,379,572 A * | 4/1983 | Hedenberg | 280/86.75 |
| 4,518,171 A * | 5/1985 | Hedenberg | 280/6.159 |
| 4,541,653 A * | 9/1985 | Raidel | 280/124.109 |
| 4,856,812 A | 8/1989 | Stephens et al. | 280/678 |
| 5,667,240 A * | 9/1997 | Mitchell | 280/124.131 |
| 5,690,353 A * | 11/1997 | Vandenberg | 280/124.116 |
| 5,785,345 A * | 7/1998 | Barlas et al. | 280/124.165 |
| 5,873,581 A | 2/1999 | Yale | 280/5.519 |
| 6,015,158 A | 1/2000 | Overby | 280/124.163 |
| 6,086,077 A * | 7/2000 | Stuart | 280/124.116 |
| 6,135,470 A * | 10/2000 | Dudding | 280/124.128 |
| 6,328,324 B1 * | 12/2001 | Fenton | 280/124.163 |
| 6,454,283 B1 * | 9/2002 | Fenton | 280/124.163 |
| 6,769,703 B1 * | 8/2004 | VanDenberg | 280/124.116 |
| 2001/0008333 A1 * | 7/2001 | McKenzie et al. | 280/124.157 |
| 2003/0146592 A1 * | 8/2003 | Chalin et al. | 280/124.116 |

FOREIGN PATENT DOCUMENTS

| | | |
|---|---|---|
| EP | 0 940 272 A1 | 2/1999 |
| WO | WO 00 76795 | 12/2000 |

* cited by examiner

*Primary Examiner*—Devon C. Kramer  
(74) *Attorney, Agent, or Firm*—Heslin Rothenberg Farley & Mesiti P.C.

(57) ABSTRACT

A pneumatic front suspension assembly for an industrial vehicle comprises: a front axle linked to a pair of side-members, and a pair of airbags for adjusting the height of the axle relative to the side-members. On each side, there is provided a rigid arm whereof one end is articulated relative to the side-members, and the other end receives the axle and the lower part of the suspension air bags; a pair of connecting rods mutually articulated about a pin substantially parallel to the axle, one of said connecting rods, the upper connecting rod, being articulated relative to the side-member, the other connecting rod, the lower connecting rod, being articulated relative to the rigid arm, and a generally U-shaped additional element, forming an anti-roll bar, and including a transverse rod linked to the lower connecting rods at their articulation points with the rigid arms, and branches located on either side of the transverse rod, and linked to the lower connecting rods.

10 Claims, 2 Drawing Sheets

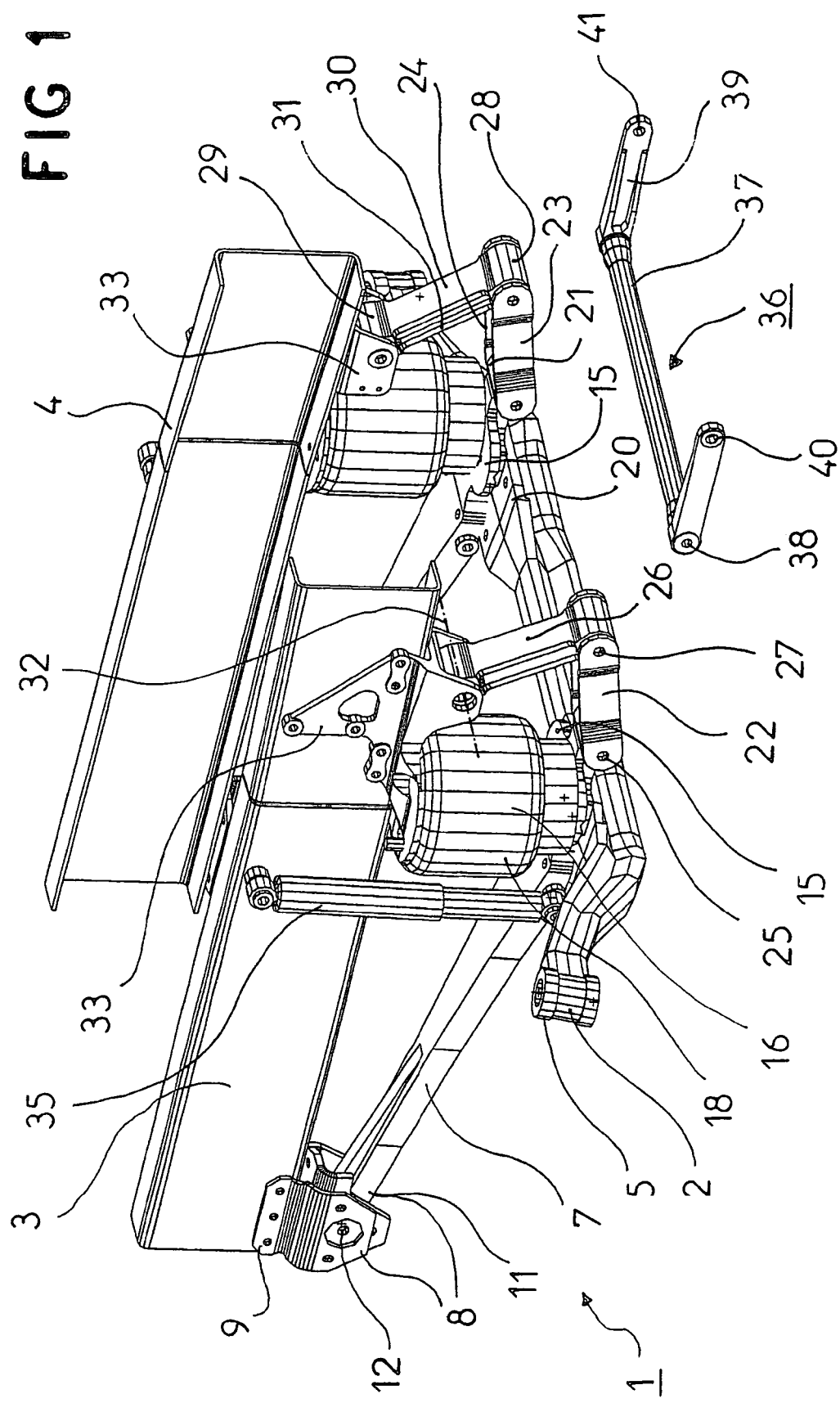

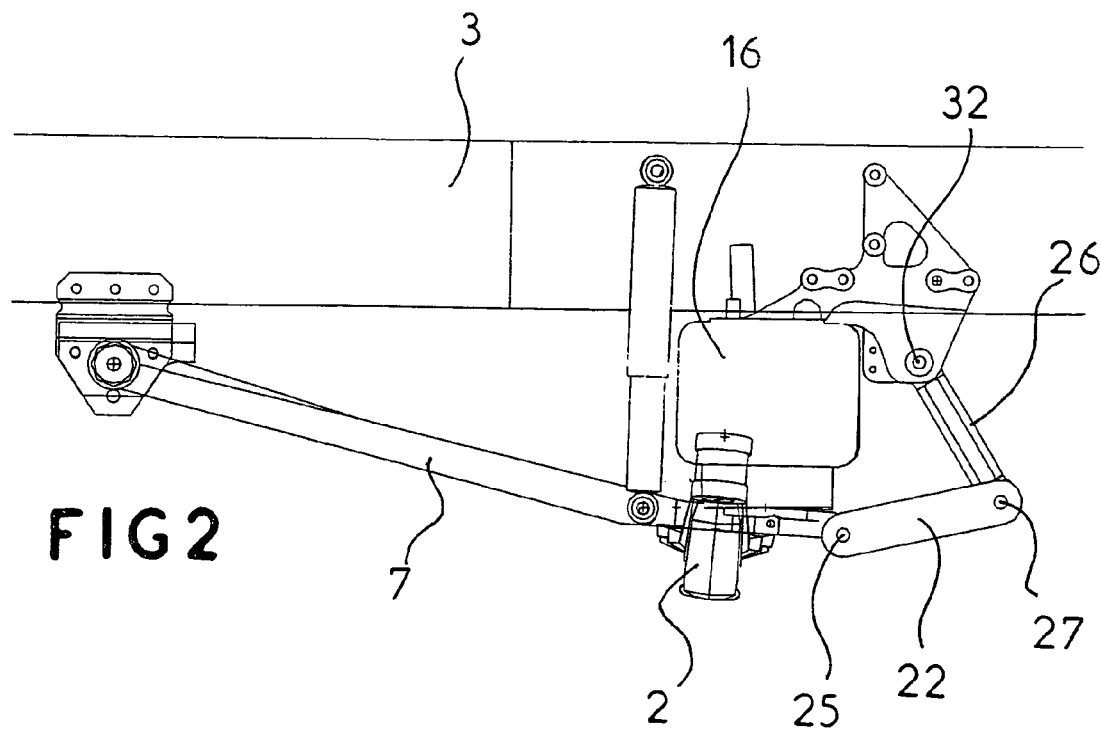
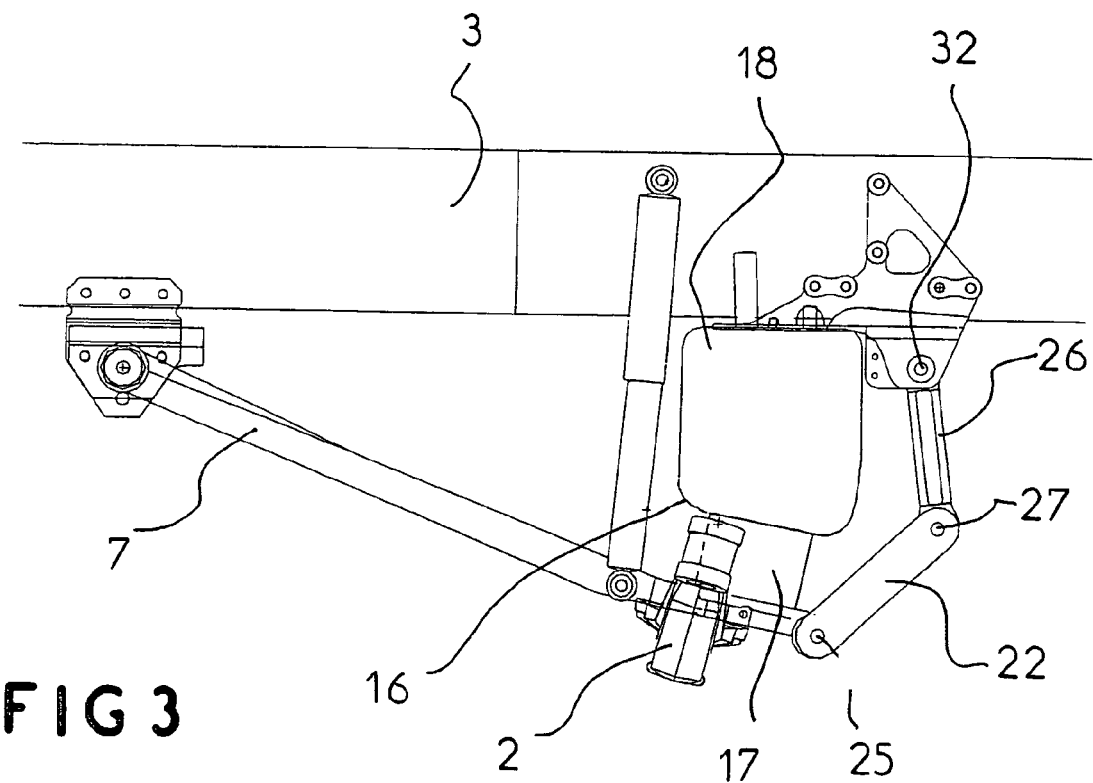

PNEUMATIC FRONT SUSPENSION ASSEMBLY FOR INDUSTRIAL VEHICLE

CROSS REFERENCE TO RELATED APPLICATION

This application is a continuation of International Application PCT/FR02/02307 filed on Jul. 2, 2002 and published in French as WO03/016620 on Feb. 13, 2003, and claims priority of French application No. 01.10091 filed Jul. 27, 2001, the contents of which applications is incorporated by reference herein, in their entirety.

TECHNICAL FIELD

The invention concerns the field of industrial vehicles. It concerns more particularly vehicles with a rigid front axle associated with a pneumatic suspension device. More specifically it is aimed at a suspension assembly that provides optimal guidance of the front axle while allowing the axle considerable vertical travel.

PRIOR ART

In general, the front suspension of a vehicle links the front axle to the chassis via an elastic unit and shock absorbers. It is common for industrial vehicles to be fitted with pneumatic suspensions which provide greater comfort and other advantages over purely mechanical suspensions. A pneumatic suspension therefore mainly comprises an air bag fixed to both the axle and the chassis. More precisely, the air bag is linked to the side members on each side of the chassis. By appropriately controlling the air bag the height of the side members can be adjusted relative to the axle.

Various solutions have already been proposed to produce pneumatic suspensions for the front axle.

So, a first solution consists in mounting the axle on a flexible leaf spring. This leaf spring is linked at one end to the side members of the chassis. The other end of the leaf is linked to the chassis via a pivoting unit such as a shackle. The air bag is interposed between the flexible leaf and the side member. As the air bag is adjusted, the leaf spring is flexed to a greater or lesser degree, such flexing resulting in a pivoting of the shackle linking the leaf spring to the side members.

Such a device is notably described in document U.S. Pat. No. 5,873,581. This solution has a number of disadvantages.

Specifically, the travel of the chassis relative to the axle is relatively limited, because it depends on the flexing capability of the leaf spring. To present sufficient strength, this leaf must be sufficiently thick which limits its ability to flex. On the other hand, the leaf spring's ability to flex leads to inadequate guidance of the axle, since the leaf can twist due to its relative thinness compared with its width. So transverse movements of the axle are observed which are prejudicial to good road holding.

A problem which the invention proposes to solve is that of allowing a considerable travel of the chassis relative to the axle without inducing transverse movement.

Another solution has been proposed in which the axle is linked to the side members via two longitudinal links disposed in parallel. These links form a flexible parallelogram with a support piece integral with the axle. Adjusting the air bag moves the side member closer to or further from the axle, causing the connecting rods to pivot relative to the side members. In order to bear transverse loads, the device comprises a transverse link linking a side member with the support piece associated with the opposite side member. This solution has the disadvantage of producing a poor kinematic linkage, because the transverse link moves in a circular arc during the vertical motions of the axle. The movement of this transverse link therefore induces transverse movements of the axle which adversely affect road holding.

A problem which the invention proposes to solve is therefore that of ensuring correct guidance of the lateral axle by eliminating as much as possible the transverse movements of the axle during its vertical motions.

Another solution has been described in document EP 0 940 272, in which solution the axle is mounted under a rigid arm pivoting relative to the side members. The adjustment of the air bag interposed between this rigid arm and the side member causes this rigid arm to pivot. In order to bear transverse loads, the presence of a transverse link is necessary, with the disadvantages of the corresponding kinematic linkage previously described.

Another solution has been described in document U.S. Pat. No. 6,015,158. In this solution, the axle is linked to the side members via a flexible leaf spring and a pivoting mechanism. More precisely, the axle is mounted on a flexible leaf of which one end is connected to the side members. The other end of that flexible leaf is articulated on a mechanism including the air bag as well as a resilient block.

This solution combines the shock absorbing effects of the air bag and of the rubber block. However, this solution has the disadvantage inherent in the use of a leaf spring, that is a short travel and a tendency to allow transverse motions that compromise road holding.

DESCRIPTION OF THE INVENTION

The invention therefore concerns a pneumatic front suspension assembly for industrial vehicles. In a known manner, this suspension assembly comprises:
 a front axle linked to a pair of side members;
 a pair of air bags for adjusting the height of the axle relative to the side members.

In accordance with the invention, the suspension assembly is characterized in that it comprises on each side:
 a rigid arm, of which one extremity is articulated relative to the side members and of which the other extremity receives the axle and the bottom part of one of the air bags;
 a pair of links mutually articulated about a pin substantially parallel to the axle, one of these links, the upper link, being articulated relative to the side member, the other link, the lower link, being articulated relative to the rigid arm.

The suspension assembly also comprises a basically U-shaped additional element forming an anti-roll bar. This anti-roll bar comprises:
 a transverse rod linked to the lower bars at their articulation points with the rigid arms;
 branches located on either side of the transverse rod, these branches being linked to the lower links.

In other words, the suspension is composed on either side of a flexible parallelogram consisting of the side member, the rigid arm and the two articulated links. The axle is located close to the top of this flexible parallelogram corresponding to the articulation of the rigid arm and the lower characteristic link. The height adjustment of the chassis relative to the axle is determined by the adjustment of the air bag which therefore links the top of the parallelogram referred to above and the corresponding side member.

The height of the side member relative to the chassis is adjusted without any elastic flexing of the various elements constituting the suspension, but on the contrary by the geometric flexing of the characteristic flexible parallelogram. It is therefore possible to adjust the travel of the side member relative to the axle by selecting the best dimensions for each of the elements and notably of the two characteristic links. So travels of the order of 250 millimeters can be attained, as compared with values of 180 millimeters for the travels usually observed on the vehicles of the prior art.

In addition, the pair of characteristic links is articulated about a pin substantially parallel to the axle, such that these links act like two shackles of relatively great width.

This configuration is capable of absorbing transverse loads. The suspension therefore has no transverse link which as we have seen previously would cause a kinematic linkage prejudicial to road holding. The flexing of the flexible parallelogram therefore occurs in one and the same substantially vertical plane, with no risk of having the axle move transversally.

In practice, the rigid arm is articulated to the side member by its front extremity such that the characteristic links are located at the rear of the axle, in the direction of the vehicle's movement.

In addition, the anti-roll bar couples the flexing of the two suspensions thus ensuring an increase in anti-roll rigidity, such rigidity being adaptable to suit the usage of the vehicle.

Advantageously in practice, the branches of the anti-roll bar are linked to the lower links at the articulations of these latter with the upper links.

In a preferred form, the features of the suspension are improved by the addition of supplementary shock absorbers, articulated both to the side members and the rigid arms.

In practice, each of the rigid arms presents at its rear extremity a broadened area on which is mounted the bottom part of the air bag. Advantageously in practice, this broadened area is made integral with the upper face of the axle.

BRIEF DESCRIPTION OF THE FIGURES

The manner of implementing the invention as well as the advantages derived from it will clearly emerge from the description of the mode of embodiment which follows, in support of the appended figures in which:

FIG. 1 is an outline three-quarter rear perspective view of two suspension assemblies, right and left, complying with the invention.

FIGS. 2 and 3 are side views of the suspension assembly in FIG. 1, shown one in each of two adjustment positions of the air bag.

MODE OF EMBODIMENT OF THE INVENTION

As already stated, the invention concerns a suspension assembly fitted to the front axle of an industrial vehicle.

More precisely, and as illustrated in FIG. 1, such a suspension assembly (1) can be used to adjust the height of the chassis relative to the axle. In the form illustrated in FIG. 1, the chassis is represented by only two side members (3, 4) located either side of the vehicle. The front axle (2) illustrated in FIG. 1 extends between the two side members (3, 4) and is continued laterally by slightly raised portions (5), to receive the stub axles.

According to the invention, the suspension device comprises, on either side, a rigid arm (7) which is articulated relative to the side members (3). The articulation with the side member (3) is effected by a spring carrier arm (8). This spring carrier arm (8) is attached by its top part (9) for example by being bolted onto the side member (3). The bottom part of this spring carrier arm (8) straddles the front extremity (11) of the rigid arm (3) allowing the passage of a pivot pin (12) running through the front extremity of that arm (3).

This rigid arm continues rearwards while broadening to form a platform (15) designed to receive the bottom part of the air bag (16). More precisely, the foot (17) of the air bag (16) is fixed, for example bolted, to this broadened area (15) forming a platform. This broadened area (15) is also bolted to the top face (20) of the axle (2), such that the axle (2) can then pivot relative to the side members (3, 4) around the pin (12). In its rear part, the platform (15) forming the extremity of the rigid arm (7) comprises a journal (21). This journal (21) receives a link (22) formed by two parallel vertical plates (23, 24). On the opposite side of the pivot pin (25) to the arm (7) side, this lower link (22) is articulated relative to the upper link (26) around the pin (27). This pin (27) is substantially parallel to the axle (2). This upper link (26) comprises a journal (28, 29) at either end and two parallel plates (30, 31) presenting a width substantially equal to the distance separating the plates (23, 24) forming the lower link (22). The upper journal (29) of the upper link (26) is articulated relative to a clevis (33) attached to the side member (4).

In this manner, the assembly formed by the side member (3), the upper link (26), the lower link (22) and the rigid arm (7) forms a flexible parallelogram, the vertices of which are the four pivot pins (12, 25, 27, 32).

The flexing of this parallelogram is provided by the action of the air bag (16). As already pointed out, the foot (17) of this air bag (16) is attached to the rear extremity of the rigid arm (3). The head (18) of the air bag is, for its part, attached to the side member (3) by means of a support piece (33). Appropriate inflation of the air bag (16) therefore enables height adjustment between the rigid arm (7), and hence the axle (2), and the side member (3).

In a complementary manner, the suspension assembly also comprises a hydraulic shock absorber (35) articulated on the side member (3) and on the rigid arm (7). This shock absorber (35) complements the suspension function provided by the air bag (16).

As illustrated in figure 1, the two suspension assemblies located either side of the vehicle are coupled together by an anti-roll bar (36). This anti-roll bar (36) comprises a crossbar (37) mounted between the bottom extremities of the lower links (22). This crossbar (37) is mounted colinearly with the pin (25) enabling the pivoting of the lower links (22) relative to the rigid arm (7). This crossbar (37) is supplemented by two lateral branches (38, 39), the free ends of which (40, 41) are in turn attached at the level of the pivot pins (27) of the upper link (26) and lower link (22). In the form illustrated, and for a better understanding, the anti-roll bar (36) has been shown before being installed.

Due to the width of the upper link (26) and lower link (22), transverse loads are taken at the pins (25, 27, 32) through which the upper link (26) and lower link (22) pivot mutually and relative both to the side members (3, 4) and to the rigid arms (7). Hence excellent transverse guidance is obtained which improves the vehicle's road holding.

FIGS. 2 and 3 illustrate two different height adjustment positions of the side member relative to the axle. Thus, in FIG. 2, the air bag (16) is represented in its most compact configuration. In this case, the upper link (26) and lower link (22) substantially form an acute angle such that the rigid arm (7) is in its closest position to the side member (3). In this situation, the distance between the axle (2) and the side member (3) is thus reduced.

On the other hand, and in the situation illustrated in FIG. 3, the air bag (16) is in its most extended configuration. In this case, the lower (22) and upper (26) links form with each other an obtuse angle and the rigid arm (7) is in its furthest position from the side member (3).

The two side members (3) are therefore in a high position relative to the axle (2).

The travel of the side member (3) relative to the axle (2), corresponding to the height difference measured between FIGS. 2 and 3, is more than 250 millimeters, as compared with travels of 180 millimeters as usually observed in suspensions of the same category.

The foregoing shows that the suspension assembly complying with the invention exhibits many advantages and particularly that of enabling a relatively long travel of the axle relative to the chassis, while ensuring faultless transverse guidance, that is with a purely vertical travel of the axle.

The invention claimed is:

1. A pneumatic front suspension assembly for an industrial vehicle, comprising:
   a front axle linked to a pair of side members;
   a pair of air bags for adjusting height of the axle relative to the side members;
   and, on each side:
   a rigid arm, of which one extremity is articulated relative to a side member and of which an other extremity receives the axle and a bottom part of one of the air bags;
   a pair of links mutually articulated about a pin substantially parallel, to the axle, an upper link of the pair of links, being articulated relative to the side member, a lower link of the pair of links being articulated relative to the rigid arm, the pair of links absorbing transverse loads so as to substantially eliminate transverse movements of the axle during vertical motions of the axle without resort to or inclusion of a transverse link between a side member and the axle;
   and a basically U-shaped additional element forming an anti-roll bar, comprising:
   a transverse rod mounted between a bottom extremity of each lower link at an articulation point of the lower link with the rigid arm; and
   branches located on either side of the transverse rod, and linked to a respective lower link.

2. The suspension assembly as claimed in claim 1, wherein the rigid arm is articulated to the side member by a front extremity of the rigid arm.

3. The suspension assembly as claimed in claim 1, wherein the branches of the anti-roll bar are linked to the respective lower link at an articulations of the lower link with the upper link.

4. The suspension assembly as claimed in claim 1, further comprising supplementary shock absorbers, articulated on the side members and rigid arm.

5. The suspension assembly as claimed in claim 1, wherein the rigid arm presents at its rear extremity a broadened area on which is mounted the bottom part of one of the air bags.

6. The suspension assembly as claimed in claim 5, wherein the broadened area is made integral with an upper face of the axle.

7. The suspension assembly as claimed in claim 1, wherein the pair of links has a width which substantially eliminates transverse movements of the axle during vertical motions of the axle.

8. The suspension assembly as claimed in claim 7, wherein the lower link comprises a pair of parallel vertical plates.

9. The suspension assembly as claimed in claim 8, wherein the upper link has a width substantially equal to a distance separating said plates.

10. The suspension assembly as claimed in claim 9, wherein the upper link comprises a pair of parallel plates.

* * * * *

UNITED STATES PATENT AND TRADEMARK OFFICE
CERTIFICATE OF CORRECTION

| | |
|---|---|
| PATENT NO. | : 7,036,805 B2 |
| APPLICATION NO. | : 10/757634 |
| DATED | : May 2, 2006 |
| INVENTOR(S) | : Renaudot |

It is certified that error appears in the above-identified patent and that said Letters Patent is hereby corrected as shown below:

Title Page, item

(75) Inventor's Address

Delete "Lyons (FR)" and insert --Lyon (FR)--

Signed and Sealed this

First Day of August, 2006

JON W. DUDAS
*Director of the United States Patent and Trademark Office*